(12) United States Patent
Wu et al.

(10) Patent No.: US 8,902,817 B2
(45) Date of Patent: Dec. 2, 2014

(54) METHOD, MOBILE STATION, BASE STATION AND COMPUTER PROGRAM PRODUCT TO CONTROL THE ACTIVATION OF A WIRELESS CARRIER

(75) Inventors: Chunli Wu, Bejing (CN); Benoist Pierre Sebire, Tokyo (JP); Dave Randall, Hampshire (GB)

(73) Assignee: Nokia Corporation, Espoo (FI)

( * ) Notice: Subject to any disclaimer, the term of this patent is extended or adjusted under 35 U.S.C. 154(b) by 161 days.

(21) Appl. No.: 13/513,503

(22) PCT Filed: Dec. 15, 2009

(86) PCT No.: PCT/EP2009/067186
§ 371 (c)(1), (2), (4) Date: Jun. 1, 2012

(87) PCT Pub. No.: WO2011/072721
PCT Pub. Date: Jun. 23, 2011

(65) Prior Publication Data
US 2012/0250559 A1 Oct. 4, 2012

(51) Int. Cl.
*H04W 4/00* (2009.01)
*H04L 5/00* (2006.01)

(52) U.S. Cl.
CPC ............ *H04L 5/0007* (2013.01); *H04L 5/0053* (2013.01); *H04L 5/0098* (2013.01)
USPC ............ 370/328; 370/338; 370/341; 370/348

(58) Field of Classification Search
CPC .................................................. H04L 5/0007
USPC ........... 370/252, 328, 329, 331; 455/450, 522
See application file for complete search history.

(56) References Cited

U.S. PATENT DOCUMENTS

| | | | |
|---|---|---|---|
| 8,626,225 B2 * | 1/2014 | Heo et al. ...................... | 455/522 |
| 2006/0046733 A1 * | 3/2006 | Fauconnier et al. .......... | 455/450 |
| 2007/0091817 A1 | 4/2007 | Yoon et al. | |
| 2009/0238142 A1 * | 9/2009 | Chun et al. .................... | 370/331 |
| 2010/0034162 A1 * | 2/2010 | Ou et al. ....................... | 370/329 |
| 2011/0002262 A1 * | 1/2011 | Wang et al. ................... | 370/328 |

FOREIGN PATENT DOCUMENTS

| WO | 2009/123358 A1 | 10/2009 |
|---|---|---|
| WO | 2009/132290 A2 | 10/2009 |

OTHER PUBLICATIONS

"3rd Generation Partnership Project; Technical Specification Group Radio Access Network; Feasibility study for Further Advancements for E-UTRA (LTE-Advanced) (Release 9)", 3GPP TR 36.912, v9.0.0, Sep. 2009, pp. 1-55.
"Activation and Deactivation of Component Carriers", 3GPP TSG-RAN WG2 #68, R2-096752, Agenda Item: 7.3.3, Ericsson, ST-Ericsson, Oct. 9-13, 2009, pp. 1-4.

(Continued)

*Primary Examiner* — Brian D Nguyen
*Assistant Examiner* — Toan Nguyen
(74) *Attorney, Agent, or Firm* — Squire Patton Boggs (US) LLP

(57) ABSTRACT

Providing and receiving carrier information using a bitmap comprising a series of bits, each bit indicating one of two predetermined states for a respective carrier of a predetermined group of carriers.

19 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA) Medium Access Control (MAC) protocol specification(Release 9)", 3GPP TS 36.321, v9.0.0, Sep. 2009, pp. 1-47.

International Search Report and Written Opinion received for corresponding International Patent Application No. PCT/EP2009/067186, dated Sep. 30, 2010, 16 pages.

"Component Carrier Indication for Bandwidth Extension in LTE-A", 3GPP TSG-RAN WG1 #58, R1-093362, Agenda Item: 15.4, Alcatel-Lucent, Aug. 24-28, 2009, pp. 1-5.

"Carrier Activation for 4C-HSDPA", 3GPP TSG RAN WG1 #59, R1-094760, Agenda Item: 5.4.2, ZTE, Nov. 9-13, 2009, pp. 1-6.

\* cited by examiner

METHOD, MOBILE STATION, BASE STATION AND COMPUTER PROGRAM PRODUCT TO CONTROL THE ACTIVATION OF A WIRELESS CARRIER

This application was originally filed as PCT Application No. PCT/EP2009/067186 filed Dec. 15, 2009.

BACKGROUND

1. Field

The present invention relates to controlling the operation of a communication device in a system where transmissions between a communication device and an access node occur on one or a plurality of carriers. In one embodiment, each carrier is a block of orthogonal sub-carriers.

2. Description of the Related Art

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems. A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (EUTRAN).

In the Long Term Evolution (LTE) System Release 8, downlink transmissions are made according to an orthogonal frequency division multiple access (OFDMA) technique, and uplink transmissions are made according to a single carrier frequency division multiple access (SCFDMA) technique. Each transmission is made using a group of orthogonal sub-carriers. Sub-carriers are grouped into units called resource blocks, and a user device can make or receive transmissions using groups of resource blocks ranging up to a predetermined maximum number of resource blocks within a predetermined frequency block called a carrier. The bandwidth available for transmissions between a device and a radio access network node generally comprises a plurality of carriers; and each transmission is made on a selected one of the carriers. A further development of LTE Release 8 (which development is known as LTE-Advanced) provides for carrier aggregation, where two or more carriers are aggregated in order to support transmission bandwidths wider than that defined by a single carrier. In summary, devices operating under LTE Release 8 are served by a single carrier, whereas devices operating under LTE-Advanced can receive or transmit simultaneously on a plurality of carriers. The Medium Access Control layer (MAC layer) generates respective transport blocks for each scheduled carrier, and all possible HARQ repeat transmissions for any transport block take place on the same carrier to which the respective transport block was mapped.

For each carrier, some time resources (OFDM Symbols) are reserved for at least one of the transmission of physical downlink control channels (Physical Downlink Control Channel—PDCCH), and other time resources (OFDM symbols) are reserved for the transmission of physical downlink shared channels (Physical Downlink Control Channel—PDSCH), and also uplink in the case of Time Division Duplexing (TDD). The physical control channels (PDCCH) carry scheduling assignments and other control information. The physical shared channels are physical channels for which the physical downlink control channels carry scheduling information. A communication device may receive scheduling assignment(s) for a PDSCH on one carrier via a PDCCH on a different carrier. This is known as cross carrier scheduling.

It may be that a communication device needs to monitor more than one carrier to check for physical control channels directed to it.

Requiring a communication device to monitor and measure all carriers for possible allocation it is not desirable from the point of view of saving battery power. One technique for saving battery power is the Discontinuous Reception (DRX) technique of the kind specified at section 5.7 of 3GPP TS 36.321 V.9.0.0 (2009-09), in which a communication device is allowed to monitor for PDCCH discontinuously. One proposal is for a communication device to apply the same DRX operation to all carriers. Another proposal aimed at further limiting the energy a communication device expends in checking for PDCCH is to, in accordance with variations in traffic load, provide the communication device with information about which of the plurality of carriers it should monitor for any PDCCH directed to it.

SUMMARY

It is an aim of the present invention to provide a new technique for providing to a communication device information about carriers.

The present invention provides a method, comprising: generating a bitmap comprising a series of bits, each bit indicating one of two predetermined states for a respective carrier of a predetermined group of carriers.

The present invention also provides method, comprising receiving at a communication device a bitmap comprising a series of bits, each bit indicating one of two predetermined states for a respective carrier of a predetermined group of carriers.

In one embodiment of the above-described methods, said bitmap is generated at a protocol layer at which logical channels are mapped onto transport channels, and said bit map is part of a protocol data unit generated at said protocol layer; and said bitmap is included in a payload of said protocol data unit, and said protocol data unit further comprises a header including a sub-header identifying the inclusion in said payload of a bitmap providing state information for said group of carriers.

In one embodiment of the above-described methods, at least some time resources of one or more carriers of said group of carriers are used for physical control channels, and each bit indicates whether or not a communication device should monitor said respective carrier for any physical control channel directed to said communication device.

In one embodiment of the above-described methods, at least some time resources of one or more carriers of said group of carriers are used for physical shared channels; and each bit indicates whether or not a communication device should receive one or more physical shared channels transmitted via said respective carrier.

In one embodiment of the above-described methods, said carriers are downlink carriers; one or more of said downlink carriers are paired with uplink carriers; and each bit also indicates one of two predetermined states for the respective downlink carrier and the respective paired uplink carrier. In one embodiment, each bit indicates whether or not said respective carrier is to be subjected to a predetermined measurement at a communication device; and said predetermined measurement is a measurement for providing channel quality information.

In one embodiment of the above-described methods, said bitmap is transmitted/received via a physical shared channel.

In one embodiment of the above-described methods, said bitmap is transmitted/received via a physical control channel.

In one embodiment of the above-described methods, said bitmap is transmitted/received as part of radio resource control (RRC) signalling.

The present invention also provides apparatus configured to carry out the above-described methods.

The present invention also provides an apparatus comprising: a processor and memory including computer program code, wherein the memory and the computer program are configured to, with the processor, cause the apparatus at least to carry out any of the above-described methods.

The present invention also provides a computer program product comprising program code means which when loaded into a computer controls the computer to perform any of the above-described methods.

BRIEF DESCRIPTION OF THE DRAWINGS

Hereunder an embodiment of the present invention will be described, by way of example only, with reference to the following drawings, in which.

DETAILED DESCRIPTION

Figure 1:
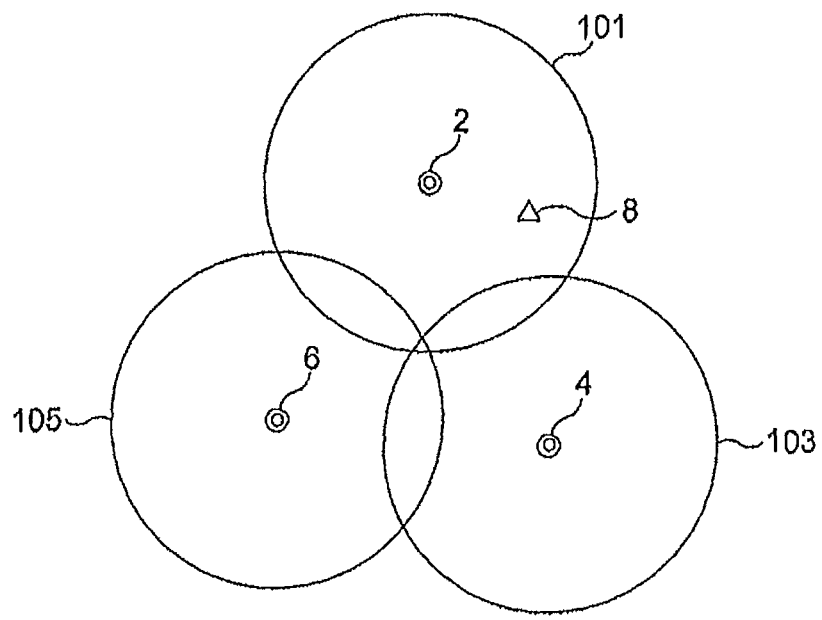
FIG. 1 illustrates a radio access network within which an embodiment of the invention may be implemented, which access network includes a number of cells each served by a respective base station (eNodeB)
Figure 2:
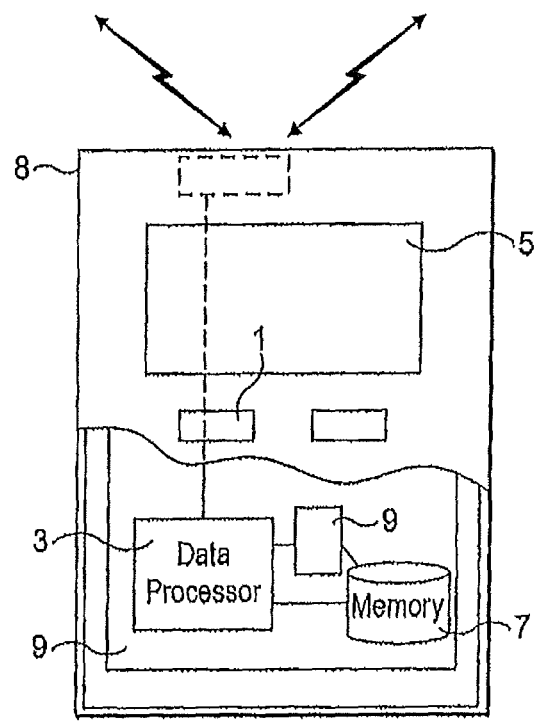
FIG. 2 illustrates a user equipment shown in FIG. 1 in further detail.
Figure 3:
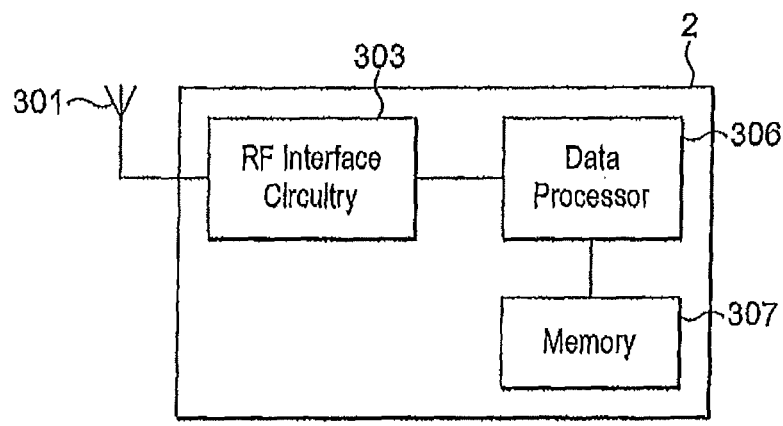
FIG. 3 illustrates an apparatus suitable for implementing an embodiment of the invention at an access node or base station of the radio network shown in FIG. 1.

FIGS. 1, 2 and 3 show respectively the communication system or network, an apparatus for communication within the network, and an access node of the communications network.

FIG. 1 shows a communications system or network comprising a first access node 2 with a first coverage area 101, a second access node 4 with a second coverage area 103 and a third access node 6 with a third coverage area 105. Furthermore FIG. 1 shows user equipment 8 which is configured to communicate with at least one of the access nodes 2, 4, 6. These coverage areas may also be known as cellular coverage areas or cells where the access network is a cellular communications network.

FIG. 2 shows a schematic partially sectioned view of an example of user equipment 8 that may be used for accessing the access nodes and thus the communication system via a wireless interface. The user equipment (UE) 8 may be used for various tasks such as making and receiving phone calls, for receiving and sending data from and to a data network and for experiencing, for example, multimedia or other content. The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

As can be seen with respect to FIG. 1, the UE 8 may be configured to communicate with at least one of a number of access nodes 2, 4, 6, for example when it is located in the coverage area 101 of a first access node 2 the apparatus is configured to be able to communicate to the first access node 2, when in the coverage area 103 of a second node 4 the apparatus may be able to communicate with the second access node 4, and when in the coverage area 105 of the third access node 6 the apparatus may be able to communicate with the third access node 6.

FIG. 3 shows an example of the first access node, which in the embodiment of the invention described below is represented by an evolved node B (eNB) 2. The eNB 2 comprises a radio frequency antenna 301 configured to receive and transmit radio frequency signals, radio frequency interface circuitry 303 configured to interface the radio frequency signals received and transmitted by the antenna 301 and the data processor 167. The radio frequency interface circuitry may also be known as a transceiver. The access node (evolved node B) 2 may also comprise a data processor configured to process signals from the radio frequency interface circuitry 303, control the radio frequency interface circuitry 303 to generate suitable RF signals to communicate information to the UE 8 via the wireless communications link. The access node further comprises a memory 307 for storing data, parameters and instructions for use by the data processor 305.

It would be appreciated that both the UE 8 and access node 2 shown in FIGS. 2 and 3 respectively and described above may comprise further elements which are not directly involved with the embodiments of the invention described hereafter. An embodiment of the present invention is described below, by way of example only, in the context of a LTE (Long Term Evolution) Advanced system that employs Orthogonal Frequency Division Multiple Access (OFDMA) for transmissions from the access node 2 to UE 8.

A portion of the frequency spectrum reserved for transmissions to or from access node 2 is divided up into a plurality of carriers. The UE 8 can make simultaneous transmissions on a plurality of the carriers and it can receive simultaneous transmissions on a plurality of the carriers. Each carrier is divided up into orthogonal sub-carriers, which can be allocated as radio resources to a transmission in groups thereof.

Figure 4A:
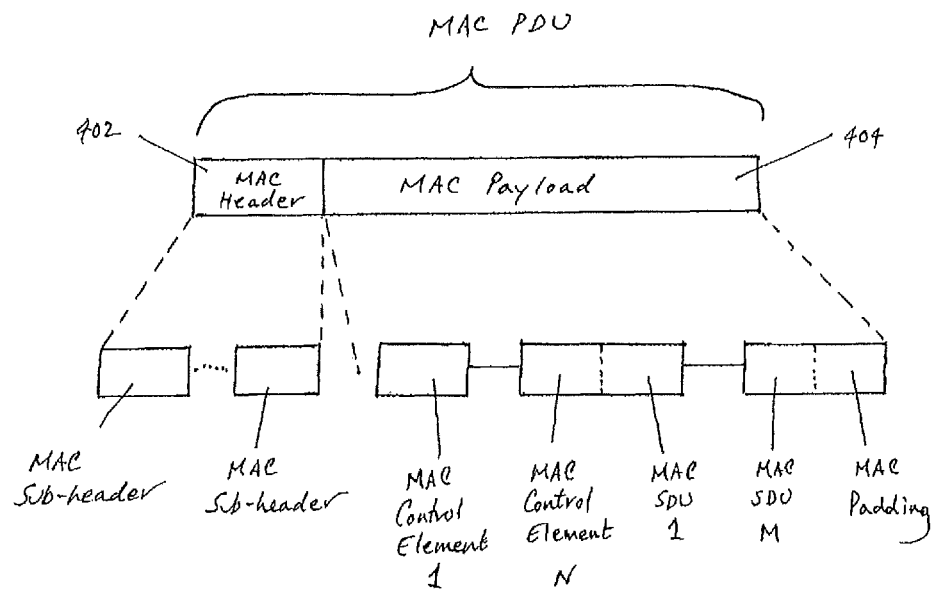
FIG. 4a illustrates the structure of a MAC protocol data unit (PDU)
Figure 4B:
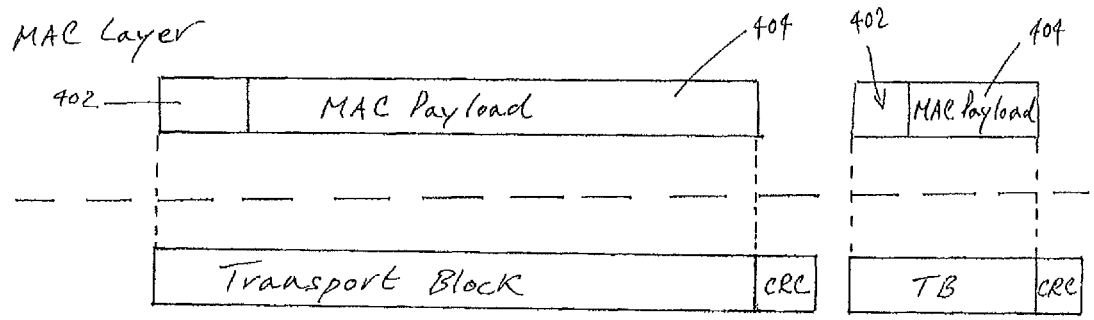
FIG. 4b illustrates how a MAC PDU unit forms a transport block in the physical layer.

For any given time transmission interval, the MAC layer at the UE 8 generates a separate MAC protocol data unit (PDU) for each carrier scheduled for a transmission from access node 2 to UE 8, which PDU forms a respective transport block in the physical layer. Each MAC PDU has a size corresponding to the number of resource blocks allocated to a physical shared channel (PDSCH) for the UE 8 within the respective carrier. Each MAC PDU includes a MAC header 402 and a MAC payload 404 including zero, one or more control elements (CEs) and/or zero, one or more MAC service data units (SDUs) received from an upper protocol layer via logical channels (not shown). The structure of a MAC PDU and how it becomes a transport block in the lower, physical layer is illustrated in FIGS. 4(*a*) and 4(*b*). In FIG. 4(*b*), CRC is the cyclic redundancy check.

With reference to 3GPP TS 36.321 V.9.0.0, the MAC protocol layer at UE 8 provides data transfer and radio resource allocation services to upper protocol layers; and the lower physical layer provides the following services to the MAC layer: data transfer services; signalling of HARQ feedback; signalling of Scheduling Request (SR); and measurements (e.g. Channel Quality Indication (CQI). The access to the data transfer services is through the use of transport channels. The characteristics of a transport channel are defined by its transport format (or format set), specifying the physical layer processing to be applied to the transport channel in question, such as channel coding and interleaving, and any service-specific rate matching as needed.

The following functions are supported by the MAC layer: (i) mapping between logical channels and transport channels; (ii) multiplexing of MAC SDUs from one or different logical channels onto transport blocks (TB) to be delivered to the physical layer on transport channels; (iii) demultiplexing of MAC SDUs from one or different logical channels from transport blocks (TB) delivered from the physical layer on transport channels; (iv) scheduling information reporting; (v) error correction through HARQ; (vi) priority handling between UEs by means of dynamic scheduling; (vii) priority handling between logical channels of one UE; (viii) Logical Channel prioritisation; and (ix) transport format selection.

In accordance with a first embodiment of the present invention, the MAC layer at access node 2 generates for inclusion in the payload of a MAC PDU a downlink MAC control element including information about the activation state for each of the plurality of individual carriers in relation to UE 8. The MAC control element includes a bitmap. The position of a bit in the bitmap maps to a respective one of all the carriers reserved for transmissions to or from the access node 2. The UE 8 knows which bit maps to which carrier from information received from the access node 2 as part of Radio Resource Control (RRC) signalling. For example, where the total number of carriers reserved for transmissions to or from the access node 2 is 5, the MAC control element consists of a single octet; five bits are used for the bitmap, and the remaining three bits are reserved. In the bitmap, "1" indicates that the respective carrier is activated, and "0" indicates that the respective carrier is deactivated. A unique logical channel ID (LCID) field in the associated sub-header of the MAC header indicates that the MAC control element is one that provides information about the activation state of the carriers.

Figure 5:
FIG. 5 illustrates an example of a MAC control element for use in a method according to an embodiment of the present invention.

FIG. 5 illustrates an example of a MAC control element of the kind described above. The control element (CE) is a fixed length control element, and consists of a single octet including three reserved bits R set to "0" and a 5-bit field containing the bitmap.

Figure 6:
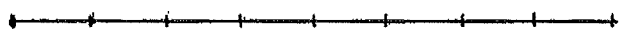
FIG. 6 illustrates an example of a sub-header for a MAC PDU in a method according to an embodiment of the present invention.
Figure 7:
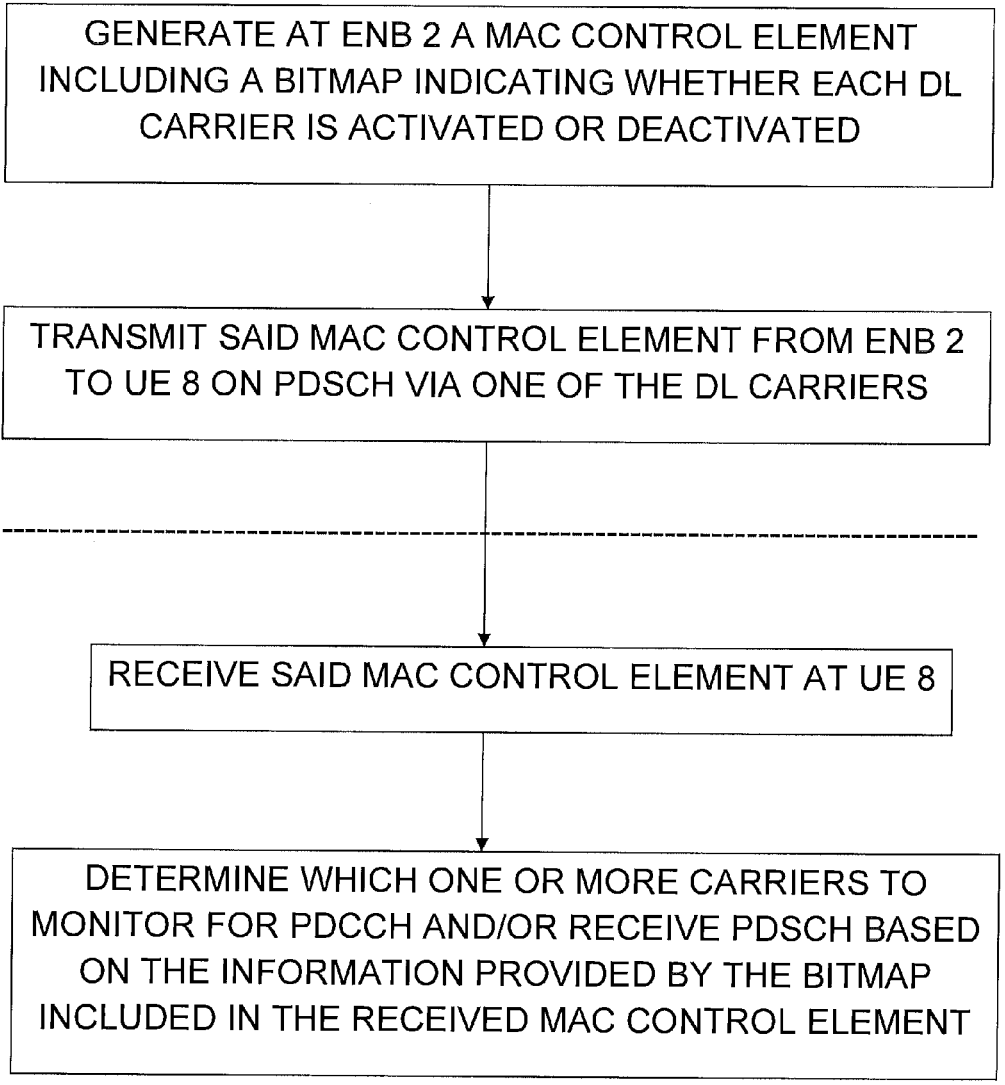
FIG. 7 illustrates an example of the operation of access node 2 and UE 8 in accordance with an embodiment of the present invention.

FIG. 6 illustrates an example of a general structure for a MAC sub-header for a fixed size MAC control element. It consists of six header fields R/R/E/LCID. The 5-bit LCID identifies the type of the corresponding MAC control element. According to this embodiment of the present invention, the LCID value is a unique value indicating that the MAC control element is a MAC control element is one that provides information about the PDCCH monitoring set. The Extension (E) field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte. The Reserved (R) fields are set to "0".

The MAC PDU in which the above-described control element is included is transmitted via a physical shared channel (PDSCH) on one of the carriers. UE 8 receives the physical shared channel in accordance with downlink scheduling information received on a PDCCH transmitted via one of the carriers.

Deactivation of a carrier means that UE 8 stops any operation (i.e. both monitoring PDCCH and receiving PDSCH) in relation to that carrier.

Activation of a carrier means that UE 8 starts (i) monitoring said carrier for physical control channels (PDCCH) directed to it, and (ii) receiving physical channels (PDSCH) on said carrier, both in alignment with the DRX cycle defined commonly for all carriers. Deactivation of a carrier means that UE 8 stops any operation (i.e. both monitoring PDCCH and receiving PDSCH) in relation to that carrier. Cross-carrier scheduling of the kind mentioned in the earlier part of this specification is only allowed among activated carriers. This simplifies the scheduling operation at access node 2, and implementation at UE 8.

For any carrier for which no time resources are reserved for PDCCH (such as a carrier segment or an extension carrier), the control element described above can be used to activate and deactivate the reception by UE 8 of PDSCH on any such carrier.

Where a separate set of carriers are used for uplink transmissions, and each uplink carrier is paired with a respective downlink carrier, then an uplink carrier is automatically activated for UE 8 if the paired DL is activated for UE 8, or an uplink carrier is activated when UE 8 is scheduled for a PUSCH (Physical Uplink Control Channel) on that uplink carrier or when UE 8 needs to make a PUUCH (Physical Uplink Control Channel) on that uplink carrier.

UE 8 implements the changes indicated by the activation/deactivation bitmap as soon as UE 8 is within an active part of the DRX cycle after receipt of said bitmap.

In the embodiment described above, dynamic control of which carriers are monitored by UE 8 can enhance the battery performance at UE 8 and can reduce the risk of PDCCH false alarms (i.e. UE 8 incorrectly interpreting noise detected on a carrier frequency as a PDCCH directed to it).

Figure 8:
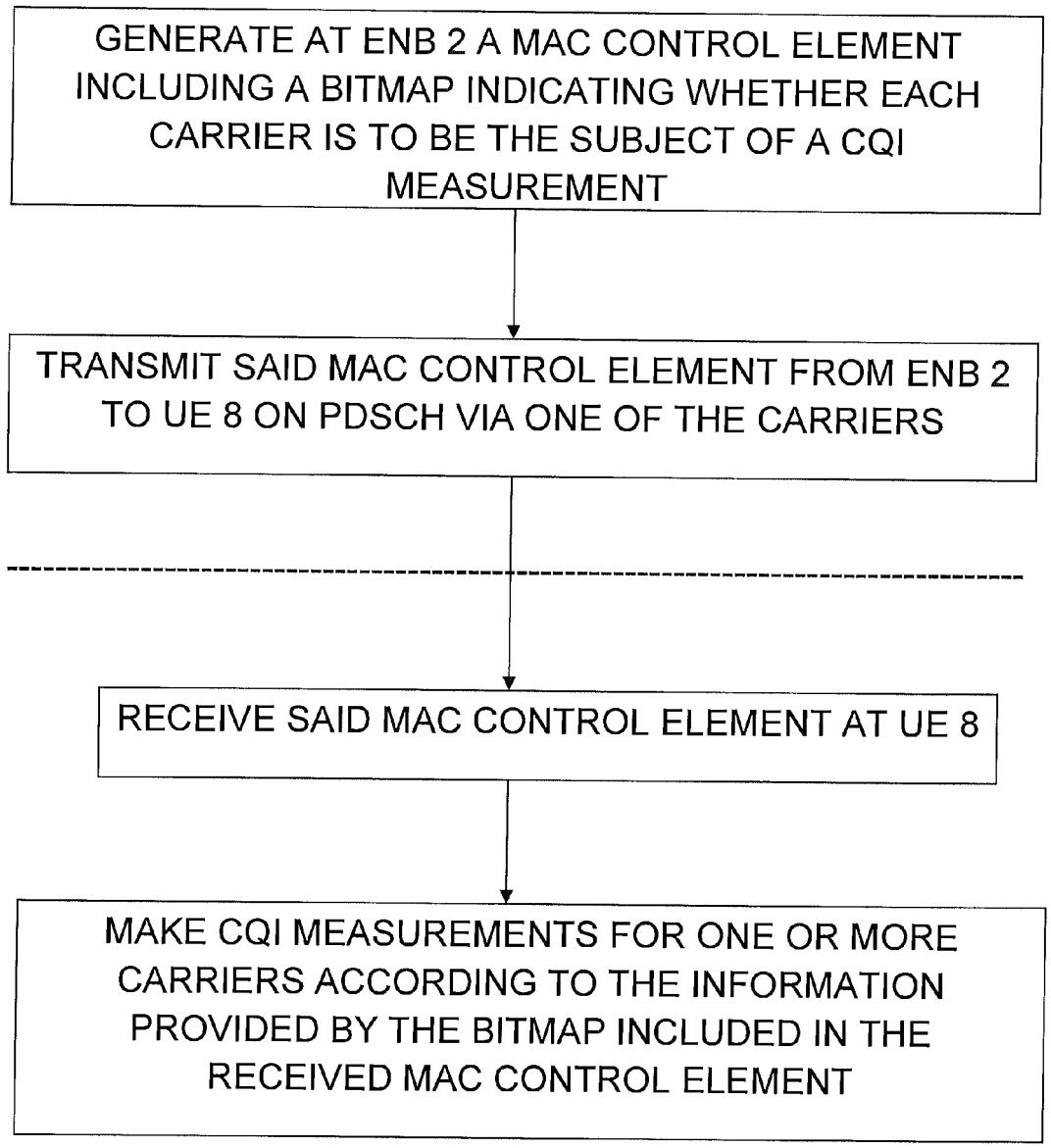
FIG. 8 illustrates an example of the operation of access node 2 and UE 8 in accordance with another embodiment of the present invention.

According to a second embodiment of the invention, the same kind of bitmap is used to provide to UE 8 information about whether each carrier should be the subject of wideband measurements such as measurements for providing channel quality information (CQI) to eNB 2. "1" indicates that the respective carrier should be the subject of such measurement; "0" indicates that the respective carrier should not be the subject of such measurement. This second embodiment is illustrated in FIG. 8.

In the embodiments described above, the bitmaps are sent to UE 8 in MAC control elements via a PDSCH. According to one variation, the bitmaps are sent via a PDCCH or as part of Radio Resource Control (RRC) signalling.

In the above-described embodiments, one example for the plurality of carriers is 5 component carrier (CC) each having a size of 20 MHz.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication. In addition to the modifications explicitly mentioned above, it will be evident to a person skilled in the art that various other modifications of the described embodiment may be made within the scope of the invention.

The invention claimed is:

1. An apparatus comprising at least one processor; and at least one memory including computer program code; the at least one memory and the computer program code configured to, with the at least one processor, cause the apparatus at least to:
   generate, at a protocol layer at which logical channels are mapped onto transport channels, a bitmap comprising a series of bits, each bit indicating one of two predetermined states for a respective carrier and indicating one of two predetermined states for a corresponding paired reverse direction carrier of a predetermined group of carriers; and
   incorporate the bitmap into a protocol data unit at said protocol layer,
   wherein each bit further indicates whether or not said respective carrier is to be subjected to a predetermined measurement at a communication device.

2. An apparatus according to claim 1, the at least one memory and the computer program code further configured to, with the at least one processor, cause the apparatus at least to:
   include said bitmap in a payload of said protocol data unit, and include in a header of said protocol data unit a sub-header identifying the inclusion in said payload of a bitmap providing state information for said group of carriers.

3. An apparatus according to claim 1, wherein at least some time resources of one or more carriers of said group of carriers are used for physical control channels, and
   wherein each bit indicates whether or not a communication device should monitor said respective carrier for any physical control channel directed to said communication device.

4. An apparatus according to claim 1, wherein at least some time resources of one or more carriers of said group of carriers are used for physical shared channels; and
   wherein each bit indicates whether or not a communication device should receive one or more physical shared channels transmitted via said respective carrier.

5. An apparatus according to claim 1, the at least one memory and the computer program code further configured to, with the at least one processor, cause the apparatus at least to:

transmit said bitmap via a physical shared channel, a control channel or as part of a radio resource control (RRC) signalling.

6. The apparatus according to claim 1, wherein the two predetermined states are activation states for the respective carrier.

7. An apparatus comprising at least one processor; and at least one memory including computer program code; the at least one memory and the computer program code configured to, with the at least one processor, cause the apparatus at least to:
receive at a communication device in a protocol data unit of a protocol layer at which logical channels are mapped onto transport channels a bitmap comprising a series of bits, each bit indicating one of two predetermined states for a respective carrier and indicating one of two predetermined states for a corresponding paired reverse direction carrier of a predetermined group of carriers,
wherein each bit indicates whether or not said respective carrier is to be subjected to a predetermined measurement at said communication device.

8. An apparatus according to claim 7, wherein said bitmap is included in a payload of said protocol data unit, and said protocol data unit further comprises a header including a sub-header identifying the inclusion in said payload of a bitmap providing state information for said group of carriers.

9. An apparatus according to claim 7, wherein at least some time resources of one or more carriers of said group of carriers are used for transmitting physical control channels, and
wherein each bit indicates whether or not said communication device should monitor said respective carrier for any physical control channel directed to said communication device.

10. An apparatus according to claim 7, wherein at least some time resources of one or more carriers of said group of carriers are used for physical shared channels; and
wherein each bit further indicates whether or not said communication device should receive one or more physical shared channels transmitted via said respective carrier.

11. An apparatus according to claim 7, wherein said predetermined measurement is a measurement for providing channel quality information.

12. An apparatus according to claim 7, the at least one memory and the computer program code further configured to, with the at least one processor, cause the apparatus at least to:
receive said bitmap via a physical shared channel, a physical control channel or as part of radio re-source control (RRC) signalling.

13. An apparatus according to claim 7, the at least one memory and the computer program code further configured to, with the at least one processor, cause the apparatus at least to:
postpone implementation of the status of each of the group of predetermined carriers in accordance with said bitmap from reception of said bitmap until a discontinuous reception active status is reached.

14. The apparatus according to claim 7, wherein the two predetermined states are activation states for the respective carrier.

15. A computer program product comprising a program code stored in a tangible form in a non-transitory computer readable medium configured to cause an apparatus to at least perform:
receive at a communication device in a protocol data unit of a protocol layer at which logical channels are mapped onto transport channels a bitmap comprising a series of bits, each bit indicating one of two predetermined states for a respective carrier and indicating one of two predetermined states for a corresponding paired reverse direction carrier of a predetermined group of carriers,
wherein each of said bits indicates whether or not said respective carrier is to be subjected to a predetermined measurement at said communication device.

16. A computer program product according to claim 15, wherein said bitmap is included in a payload of said protocol data unit, and said protocol data unit further comprises a header including a sub-header identifying the inclusion in said payload of a bitmap providing state information for said group of carriers.

17. A computer program product according to claim 15, wherein at least some time resources of one or more carriers of said group of carriers are used for transmitting physical control channels, and
wherein each of said bits further indicates whether or not said communication device should monitor said respective carrier for any physical control channel directed to said communication device.

18. A computer program product according to claim 15, wherein at least some time resources of one or more carriers of said group of carriers are used for physical shared channels; and
wherein each of said bits further indicates whether or not said communication device should receive one or more physical shared channels transmitted via said respective carrier.

19. The computer program product according to claim 15, wherein the two predetermined states are activation states for the respective carrier.

* * * * *